(12) United States Patent  
Bradfield

(10) Patent No.: US 8,659,374 B2
(45) Date of Patent: *Feb. 25, 2014

(54) SOLENOID COIL WITH REVERSE TURN

(71) Applicant: Remy Technologies LLC, Pendleton, IN (US)

(72) Inventor: Michael D. Bradfield, Anderson, IN (US)

(73) Assignee: Remy Technologies LLC, Pendleton, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,649

(22) Filed: Mar. 11, 2013

(65) Prior Publication Data

US 2013/0187518 A1   Jul. 25, 2013

Related U.S. Application Data

(63) Continuation of application No. 12/767,710, filed on Apr. 26, 2010, now Pat. No. 8,416,039.

(51) Int. Cl.
*H01H 67/02* (2006.01)

(52) U.S. Cl.
USPC ........... 335/126; 335/131; 335/282; 336/192; 336/198

(58) Field of Classification Search
USPC ................. 335/126–130, 182, 266, 268, 282; 336/172, 192, 198
See application file for complete search history.

(56) References Cited

U.S. PATENT DOCUMENTS

| 4,295,066 | A | 10/1981 | Lloyd et al. | |
| 4,536,728 | A | 8/1985 | Cyrot | |
| 4,551,630 | A | 11/1985 | Stahura et al. | |
| 5,563,563 | A | 10/1996 | Freitas et al. | |
| 5,673,013 | A | 9/1997 | Moody et al. | |
| 6,158,109 | A | 12/2000 | Tanabe et al. | |
| 6,633,099 | B2 | 10/2003 | Fulton et al. | |
| 7,145,259 | B2 | 12/2006 | Spellman et al. | |
| 7,236,077 | B1 * | 6/2007 | Hsu et al. | 336/180 |
| 8,058,962 | B2 * | 11/2011 | Zeng et al. | 336/208 |
| 2002/0158519 | A1 | 10/2002 | Fulton et al. | |
| 2004/0155536 | A1 | 8/2004 | Cordiale et al. | |
| 2008/0197230 | A1 | 8/2008 | Namba | |
| 2012/0140525 | A1 * | 6/2012 | Cuadra et al. | 363/21.04 |

* cited by examiner

*Primary Examiner* — Bernard Rojas
(74) *Attorney, Agent, or Firm* — Maginot, Moore & Beck LLP

(57) ABSTRACT

A solenoid arrangement includes a plunger configured to move in an axial direction and a coil wound radially outward from the plunger. The coil includes a first winding layer and at least one additional winding layer positioned radially outward from the first winding layer. The first winding layer includes a first portion wound in a first winding direction and a second portion wound in a second winding direction that is opposite the first winding direction. The at least one additional winding layer is wound in the second winding direction radially outward from both the first portion and the second portion of the first winding layer.

20 Claims, 4 Drawing Sheets

CURRENT DIRECTION
◉ OUT OF PAGE
⊗ INTO PAGE

CURRENT DIRECTION
⊙ OUT OF PAGE
⊗ INTO PAGE

SOLENOID COIL WITH REVERSE TURN

CROSS-REFERENCE TO RELATED APPLICATIONS

This application is a continuation of U.S. patent application Ser. No. 12/767,710, filed Apr. 26, 2010, now U.S. Pat. No. 8,416,039.

FIELD

This disclosure relates to the field of starter motor assemblies, and more particularly, to a solenoid assembly for a starter motor.

BACKGROUND

Starter motor assemblies that assist in starting engines, such as engines in vehicles, are well known. The conventional starter motor assembly broadly includes an electrical motor and a drive mechanism. The electrical motor is energized by a battery upon the closing of an ignition switch. The drive mechanism transmits the torque of the electric motor through various components to a flywheel gear of the engine, thereby cranking the engine until the engine starts.

During operation of the starter motor, the closing of the ignition switch (typically by turning a key) energizes a solenoid coil and, in some motors, applies some power to the electrical motor. Energization of the solenoid coil moves a solenoid core member (also referred to herein as the "plunger") in an axial direction. The movement of the solenoid plunger closes electrical contacts, thereby delivering full power to the electrical motor. The movement of the solenoid plunger also biases a pinion-type gear into engagement with the engine flywheel gear. Engagement of the rotating pinion with the flywheel in turn causes the flywheel to rotate, thereby cranking the vehicle engine. Once the vehicle engine is started, the operator of the vehicle then will open the ignition switch, which deenergizes the solenoid assembly. As a result of this deenergization, the magnetic field that caused the plunger to move decreases and at some point is overcome by a return spring.

In order for energization of the solenoid assembly to both move the solenoid plunger toward the flywheel and hold the plunger in place during pinion-flywheel engagement, solenoid assemblies often utilize two coils, i.e., a pull-in coil and a hold-in coil. In these arrangements, both coils are energized in order to bias the plunger in the axial direction for engagement with the engine flywheel. Once the plunger engages the electrical contacts such that full power is delivered to the starter motor, the pull-in coil is effectively short circuited, eliminating unwanted heat generated by the coil. The hold-in coil then holds the plunger in place in order to hold the pinion in the engagement position with the flywheel until the engine starts.

In designing solenoid coil windings for a starter motor, including the design of pull-in coils and the hold-in coils, design challenges are encountered that relate to the physical dimensions of the coils, the electrical resistance of the windings, and the resulting amp-turn excitation that each coil provides. For example, in the case of a pull-in coil, it may be desirable to increase resistance in the coil without increasing the resulting amp-turn excitation of the coil. Increasing the resistance of the pull-in coil without increasing the resulting amp-turn excitation allows the coil to have a desired resistance and still provide a desired amount of amp-turn excitation for proper movement of the plunger within the solenoid. This allows the amp-turns for the pull-in coil and the hold in coil to be properly balanced such that a spring force on the plunger will return the plunger to its original position at engine start.

In meeting the foregoing design challenge of increased resistance without increased amp-turn excitation, reverse turns are often used in solenoid arrangements. FIGS. 6A-6C show an exemplary conventional coil and spool capable of providing a reverse turn in the coil windings. In these arrangements, a conductor 132 is first wound around a spool 150 to provide a first layer 134 of windings for a coil. Next, the conductor 150 is wrapped around a hook 158 on the flange of the spool. This allows the next layer 136 of the coil (shown incomplete in FIGS. 6B and 6C) to be wound in the opposite direction from the first layer 134. These two layers 134, 136 of coil wound in opposing directions result in a net amp-turn excitation of effectively zero, as the opposing excitation provided by the first two layers of windings cancel each other out.

While the above-described arrangement for increasing resistance without increasing the amp-turn excitation of the coil provides some level of flexibility for the designer, sometimes this level of flexibility isn't sufficient. For example, design constraints may not allow two full layers of reversing turns either from a spatial or resistance standpoint. Furthermore, conventional designs do not facilitate a design where reversing turns may be provided on the innermost layer of the coil. Accordingly, it would be desirable to provide a solenoid arrangement for a starter that allows the designer additional flexibility in providing the optimal resistance and amp-turn excitation of a coil. It would also be desirable if such a solenoid arrangement were relatively simple and inexpensive to implement.

SUMMARY

In accordance with one exemplary embodiment of the disclosure, there is provided a solenoid arrangement comprising a plunger configured to move in an axial direction and a coil wound radially outward from the plunger. The coil includes a first winding layer and at least one additional winding layer positioned radially outward from the first winding layer. The first winding layer includes a first portion wound in a first winding direction and a second portion wound in a second winding direction that is opposite the first winding direction. The at least one additional winding layer is wound in the second winding direction radially outward from both the first portion and the second portion of the first winding layer.

Pursuant to another exemplary embodiment of the disclosure, there is provided a coil arrangement for a solenoid comprising a first, second and third length of a conductor. The first length of the conductor is wound in a first direction to provide a first part of a first layer of the solenoid coil. The second length of the conductor is wound in a second direction to provide a second part of the first layer of the coil, the second direction opposite the first direction. The third length of the conductor is wound in the second direction over the first part and the second part of the first layer of the coil to provide at least a second layer of the coil.

In accordance with yet another exemplary embodiment of the disclosure, there is provided a starter motor comprising an electric motor and a solenoid. The solenoid includes a plunger, a coil retaining surface, and a coil. The plunger is configured to move in an axial direction between a first position and a second position. The coil retaining surface is positioned radially outward from the plunger. The coil is formed by a conductor wound around the coil retaining surface. The conductor includes a first length, second length and third length. The first length is wound in a first direction and provides a first part of a first layer of the coil. The second length wound in a second direction opposite the first direction and provides a second part of the first layer of the coil. The third length wound in the second direction radially outward from the first part and the second part of the first layer of the coil and provides a second layer of the coil.

The above described features and advantages, as well as others, will become more readily apparent to those of ordinary skill in the art by reference to the following detailed description and accompanying drawings. While it would be desirable to provide a solenoid that provides one or more of these or other advantageous features, the teachings disclosed herein extend to those exemplary embodiments which fall within the scope of the appended claims, regardless of whether they accomplish one or more of the above-mentioned advantages.

DESCRIPTION

Figure 1:
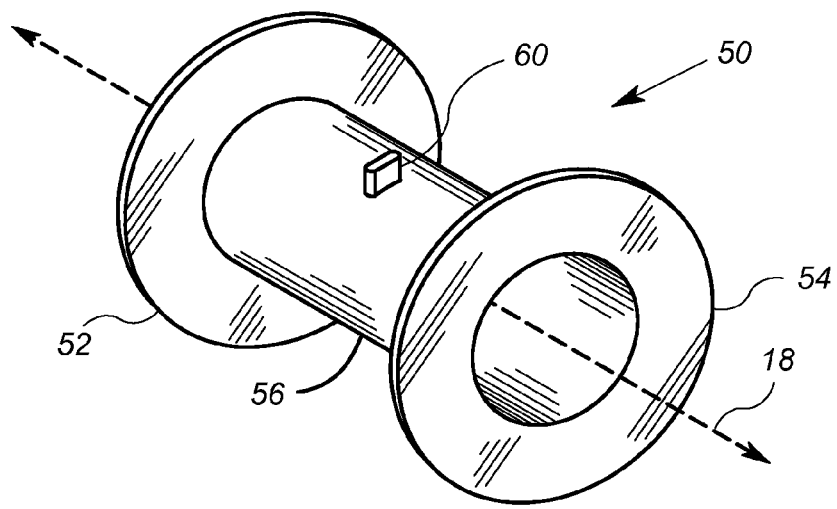
FIG. 1 shows a perspective view of a coil spool with reverse turn hub projection for a solenoid.

With reference to FIG. 1, a holder for a solenoid coil is shown in the form of a spool 50. The spool 50 includes a first end flange 52, a second end flange 54, and a hub 56 extending between the first end flange 52 and the second end flange 54. The flanges 52 and 54 are disc shaped with a center hole that allows a plunger to move in an axial direction through the center of the spool.

The hub 56 of the spool 50 is generally a cylindrical member that provides a coil retaining surface of the solenoid coil. Although a right circular cylinder is shown in the exemplary embodiment of FIG. 1, it will be recognized that the hub 56 make take on other forms, including cylindrical and non-cylindrical forms. Furthermore, the term "spool" as used herein refers to any appropriate solenoid coil holder, regardless of whether the hub is provided as a cylinder or if flanges are included on the ends of the hub.

A projection 60 is provided on the hub 56 of the spool 50. The projection 60 extends radially outward from the outer surface of the hub 56, providing a protuberance on the hub. In at least one exemplary embodiment, the projection 60 is integrally formed on the spool 50, such as by injection molding of the spool and the projection as a single piece. In other exemplary embodiments, the projection may be connected to the spool using a fastener, welding, adhesive, or other connection means.

Figure 2:
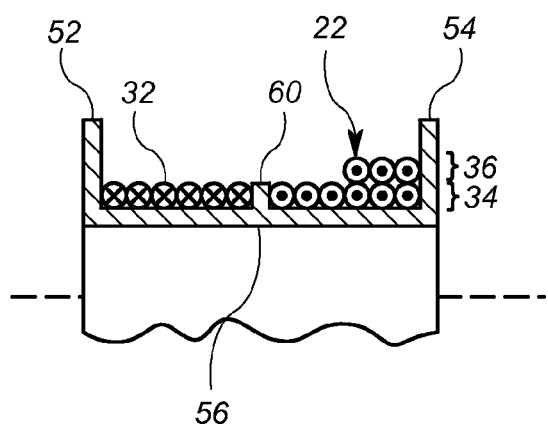
FIG. 2 shows a cross-sectional view of half of the spool of FIG. 1 with coil windings positioned on the spool.
Figure 3:
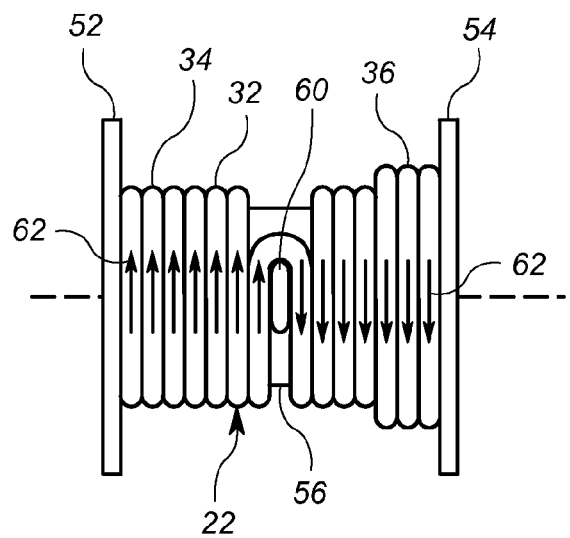
FIG. 3 shows a top view of the spool of FIG. 1 with coil windings positioned on the spool.

In the exemplary embodiment of FIGS. 1-3, the projection 60 is provided as a tab positioned substantially in the center of the hub. The tab extends about 1.0 mm to 2.0 mm radially outward from the cylindrical outer surface of the hub 56. In other exemplary embodiments, the tab may extend a greater distance from the outer surface of the hub. The tab 60 is generally block shaped with rounded edges in order to avoid sharp edges that might cut into the coil. Although the projection 60 has been shown as a tab in FIGS. 2-4, it will be recognized that in other exemplary embodiments, the projection could be a post, a hook, or any other projection extending outward from the outer surface of the hub.

As shown in FIGS. 2 and 3, a conductor 32 is wound around the hub 56 of the spool 50 to form windings of a first coil 22. FIGS. 2 and 3 show a complete first layer 34 of windings and part of a second layer 36 of windings. In the first layer 34, the conductor 32 is wound in a first direction around the first half of the spool 50 until it reaches the projection 60. The conductor 32 then wraps around the projection 60 in such a manner that the winding direction of the coil 22 is reversed at the projection. The conductor 32 is then wrapped in the opposite direction around the second half of the spool 50. These differing directions are noted in FIG. 2 by the indicia that show current into and out of the page, and in FIG. 3 by the arrows 62 on the windings. Accordingly, the first layer 34 of the coil 22 includes a first half that is wound in a first direction and a second half that is wound in an opposite direction.

At the second end 54 of the spool 50, the conductor is wound twice around the hub 56, such that the coil transitions from a first layer 34 to a second layer 36. The conductor is then wound around the spool 50, moving toward the first end 52 of the spool. FIGS. 2 and 3 show three windings on the second layer 36. As shown in FIG. 3, because the windings of the second layer 36 are radially outward from the windings of the first layer 34, the second layer windings have a larger diameter. Furthermore, the windings of the second layer 36 do not wrap around the projection 60, and all windings of the second layer 36 are wound around the spool in the same direction.

Figure 4:
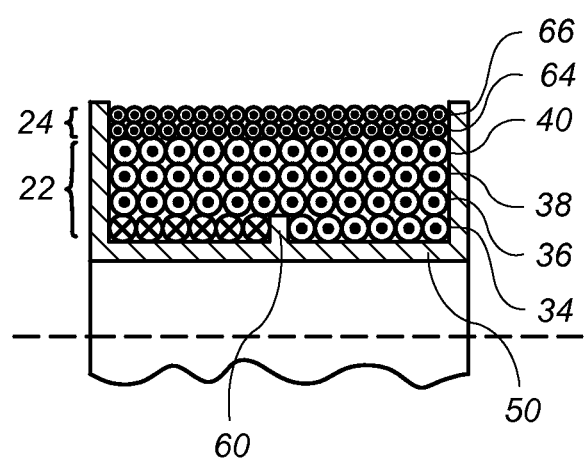
FIG. 4 shows a perspective view of the spool of FIG. 1 with a pull-in coil and a hold-in coil positioned on the spool.

FIG. 4 shows the complete first coil 22 positioned on the spool 50 as a coil with four layers 34, 36, 38 and 40. As discussed above, the winding direction of the first layer 34 changes at projection 60. As a result, when current flows through the coil 22 the resulting amp-turn excitation provided by the first layer 34 is cancelled out, leaving layers 36, 38 and 40 as the only layers that contribute to the total amp-turn excitation of the coil 22.

FIG. 4 also shows a second coil 24 positioned on the spool 50 radially outward from the first coil 22 and coaxial with the first coil. As described below with references to FIGS. 5A-5C, this second coil 24 may be used in a solenoid arrangement to provide a hold-in coil, while the first coil 22 may be used to provide a pull-in coil. Advantageously, the projection 60 provides the designer of the coil with a turn member that allows a single layer of the coil 22 to be included in the coil design that adds resistance to the coil without adding additional amp-turn excitation to the coil. This provides the coil designer with additional flexibility when considering the optimal amp-turn excitation of the two coils 22 and 24, resistance of the coils, and spatial constraints. Although the exemplary embodiments of FIGS. 2-4 show a turn member in the form of a projection, it will be recognized that a different turn member could be used in other embodiments. For example, in lieu of a projection, the turn member could be two openings in the outer surface of the hub with a center post in between the openings, thus allowing the conductor to be inserted into the first opening, pulled around the post, and out of the second opening.

Figure 5A:
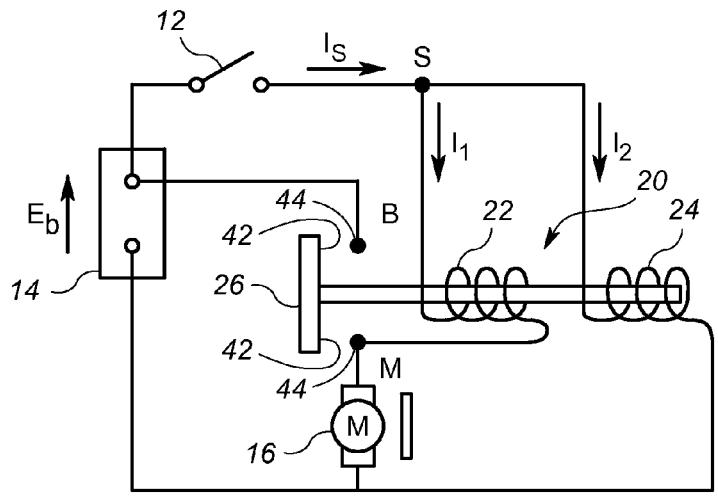
FIG. 5A shows a schematic of a starter motor arrangement including the solenoid with reverse turn hub projection of FIG. 1.
Figure 5B:
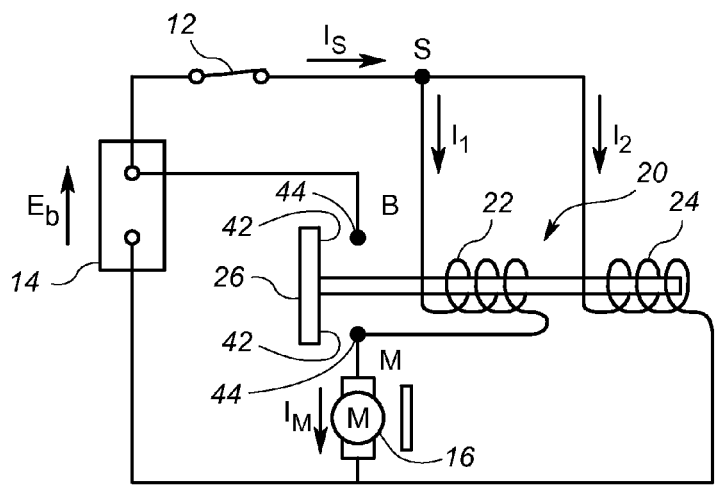
FIG. 5B shows the schematic of FIG. 5A with an ignition switch closed.
Figure 5C:
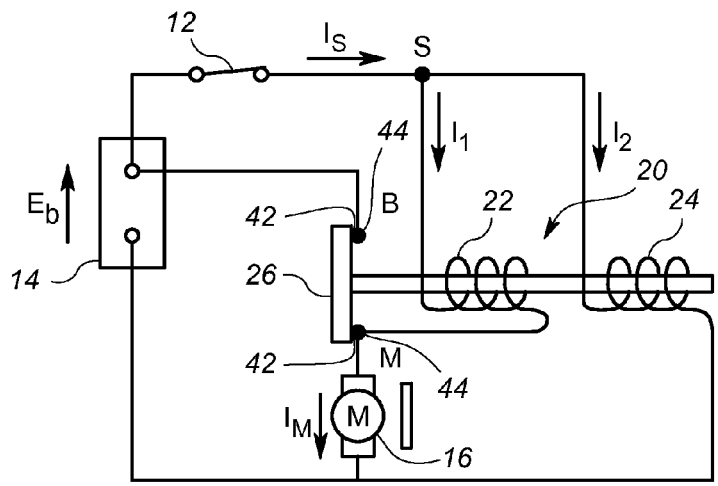
FIG. 5C shows the schematic of FIG. 5B with a solenoid plunger moved to a position where it engages electrical contacts in the starter motor.
Figure 6A:
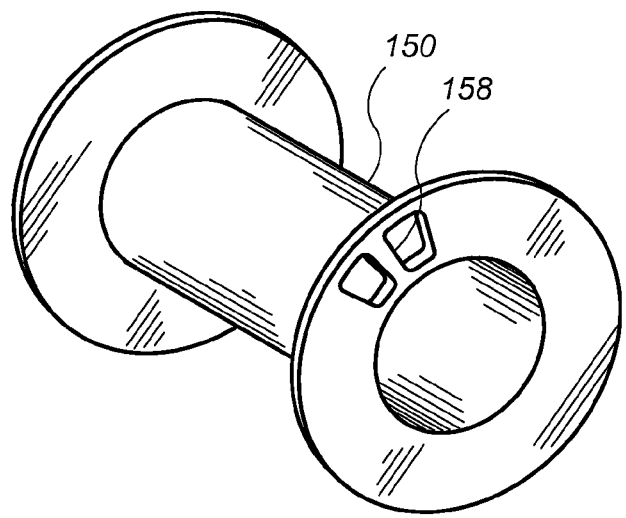
FIG. 6A shows a perspective view of a prior art spool for a solenoid.
Figure 6B:
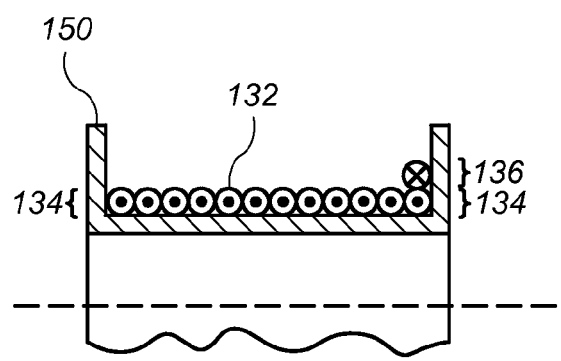
FIG. 6B shows a cross-sectional view of half of the spool of FIG. 6A with windings on the spool.
Figure 6C:
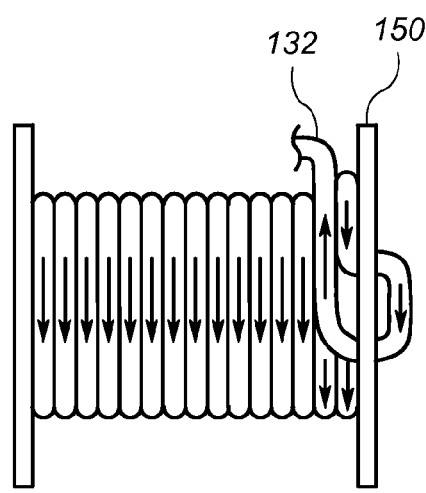
FIG. 6C shows a top view of the spool of FIG. 6A with windings positioned on the spool.

FIGS. 5A-5C are circuit diagrams illustrating the sequence of starting the starter motor in at least one exemplary embodiment of the starter motor with the solenoid assembly disclosed herein. As shown, the electrical circuit 10 for the starter motor includes an ignition switch 12, a battery 14, a motor 16, and a solenoid assembly 20. The solenoid assembly includes a solenoid coil holder 50 with a reverse turn spool hub projection 60 (as described above in FIGS. 1-4). A pull-in coil 22 is positioned on the coil holder and a hold-in coil 24 is positioned radially outward from the pull-in coil. The pull-in coil and the hold-in coil may be made of conductors in the form of insulated wound wire wrapped around the coil holder. As discussed above, the pull-in coil 22 includes a plurality of layers of increasingly greater diameter on the holder 50. The winding direction of the first layer of the coil may be reversed at the projection to meet the design requirements of the coil related to resistance of the coil and total amp-turn excitation of the coil.

FIG. 5A illustrates that point in time before ignition switch 12 is closed. At this point in time, coils 22, 24 are not energized, no electrical current is traveling through motor 16, and plunger 26 is not magnetized and, thus, not biased in an axial direction.

FIG. 5B illustrates that point in time when ignition switch 12 is closed, thereby energizing pull-in coil 22 and hold-in coil 24. Energization of coils 22, 24 in turn biases the plunger 26 to move in an axial direction (see axis 18 in FIG. 1) to effect the closing of a plunger contact 42 and two fixed contacts 44 between battery 14 and motor 16 to deliver full power to motor 16 from battery 14. Plunger contact 42 may be a copper washer and fixed contacts 44 are the heads of copper bolts.

FIG. 5C illustrates that point in time when plunger 26 is biased in the axial direction sufficiently to close contacts 42, 44 between battery 14 and motor 16, thereby delivering full power to motor 16 from battery 14. Once plunger 26 closes the contacts 42, 44, pull-in coil 22 is bypassed or short-circuited as shown in FIG. 5C.

The magnetomotive force of the pull-in coil 22 and the hold-in coil 24 add together to pull the plunger at large air gaps, when the reluctance of the magnetic circuit is highest. During the hold-in phase (i.e., during cranking of the engine), the air gap in the magnetic circuit is very small. Therefore, the reluctance of the magnetic circuit is low, and only a relatively small magnetomotive force is required to hold the plunger for pinion-flywheel engagement. Because only a small magnetomotive force is required to hold the plunger for pinion-flywheel engagement, unwanted heating from the pull-in coil is eliminated by short circuiting this coil when the contacts close to start the motor, as discussed above.

The foregoing detailed description of one or more exemplary embodiments of the solenoid coil with a reverse turn has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A solenoid arrangement comprising:
   a plunger configured to move in an axial direction;
   a coil wound radially outward from the plunger, the coil including a first winding layer and at least one additional winding layer positioned radially outward from the first winding layer, the first winding layer including a first portion wound in a first winding direction and a second portion wound in a second winding direction that is opposite the first winding direction, the at least one additional winding layer wound in the second winding direction radially outward from both the first portion and the second portion of the first winding layer.

2. The solenoid of claim 1 further comprising a coil retaining surface positioned between the plunger and the coil, the coil wound on the coil retaining surface.

3. The solenoid of claim 2 wherein the coil retaining surface is provided on a cylindrical member of a spool.

4. The solenoid of claim 2 further comprising a projection positioned on the coil retaining surface, wherein the coil engages the projection in such a manner that a winding direction of the coil is reversed from the first winding direction to the second winding direction at the projection.

5. The solenoid of claim 4 wherein the projection is a tab extending radially outward from the coil retaining surface.

6. The solenoid of claim 5 wherein the tab and coil retaining surface are integrally formed.

7. The solenoid of claim 4 wherein the projection is positioned substantially in the center of the coil retaining surface.

8. The solenoid of claim 1 wherein the coil is a first coil and the solenoid further comprises a second coil arranged coaxial with and radially outward from the first coil.

9. The solenoid of claim 8 wherein the first coil is a pull-in coil and the second coil is a hold-in coil of a starter motor solenoid arrangement.

10. The solenoid of claim 1 wherein the coil includes a first winding layer and a plurality of additional winding layers positioned radially outward from the first winding layer, wherein all of the additional winding layers are wound only in the second winding direction.

11. A coil arrangement for a solenoid comprising:
    a first length of a conductor wound in a first direction and providing a first part of a first layer of the solenoid coil;
    a second length of the conductor wound in a second direction and providing a second part of the first layer of the coil, the second direction opposite the first direction; and
    a third length of the conductor wound in the second direction over the first part and the second part of the first layer of the coil and providing at least a second layer of the coil.

12. The coil arrangement of claim 11 wherein the first length of the conductor and the second length of the conductor are wound on a cylindrical coil retaining surface.

13. The coil arrangement of claim 12 further comprising a projection on the coil retaining surface, the conductor engaging the projection, and the projection separating the first part of the first layer from the second part of the first layer of the solenoid coil.

14. The coil arrangement of claim 13 wherein the projection is a tab extending radially outward from the coil retaining surface.

15. The coil arrangement of claim 12 wherein the coil retaining surface is an outer surface of a cylindrical hub that extends between a first flange and a second flange of a spool.

16. The coil arrangement of claim 11 wherein the conductor is a first conductor providing a pull-in coil for a solenoid, the coil arrangement further comprising a second conductor wound radially outward from and coaxial with the pull-in coil and provides a hold-in coil for the solenoid.

17. A starter motor comprising:
an electric motor; and
a solenoid including:
    a plunger configured to move in an axial direction between a first position and a second position;
    a coil retaining surface positioned radially outward from the plunger; and
    a coil formed by a conductor wound around the coil retaining surface, the conductor including a first length wound in a first direction and providing a first part of a first layer of the coil, a second length wound in a second direction opposite the first direction and providing a second part of the first layer of the coil, and a third length wound in the second direction radially outward from the first part and the second part of the first layer of the coil and providing a second layer of the coil.

18. The starter motor of claim 17 further comprising a turn member positioned on the coil retaining surface, the coil wrapped at least partially around the turn member and the turn member separating the first part of the first layer from the second part of the first layer.

19. The starter motor of claim 18 wherein the coil retaining surface is a cylindrical surface and the turn member is a projection, wherein the coil engages the projection in a first layer of the coil such that the winding direction of the coil changes at the projection, and wherein the coil includes a plurality of additional winding layers positioned radially outward from the first winding layer.

20. The starter motor of claim 17 wherein the coil is a pull-in coil and the solenoid further includes a hold-in coil positioned radially outward from the pull-in coil, and wherein the plunger is configured to move in the axial direction when the pull-in coil and the hold-in coil are energized.

* * * * *